Patented May 30, 1933

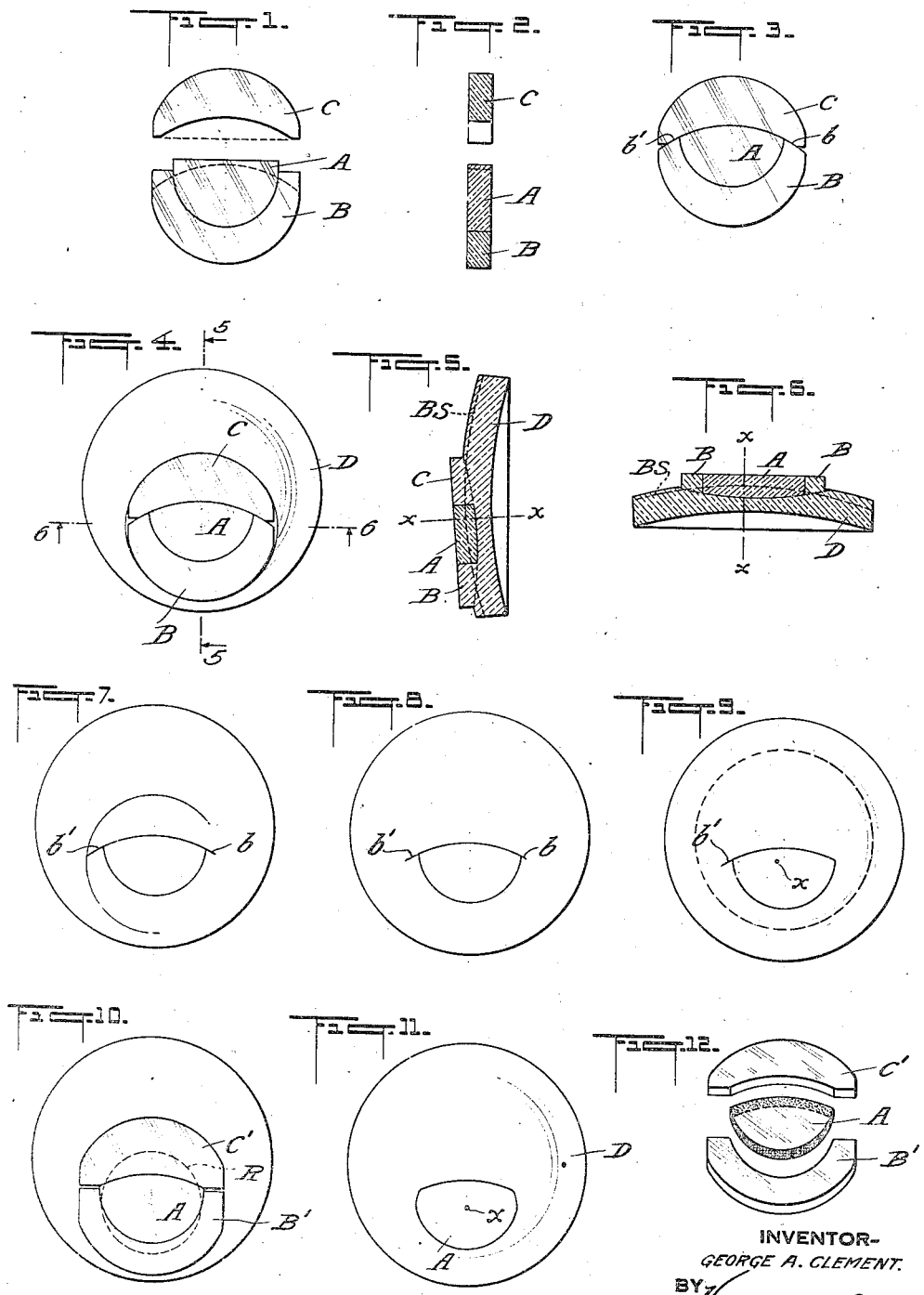

1,911,806

UNITED STATES PATENT OFFICE

GEORGE A. CLEMENT, OF MOUNT VERNON, NEW YORK

MULTIFOCAL LENS AND METHOD OF MAKING SAME

Application filed May 13, 1932. Serial No. 611,035. REISSUED

My invention relates to fused multifocal lenses and blanks therefor, i. e., blanks having a minor lens of one index of refraction fused in a depression or countersink in a major lens of different index of refraction. Both bifocal and trifocal lenses are thus made, but for the purpose of this disclosure the discussion will be confined to bifocals.

In spectacle lenses of this type the minor lens is of the higher index to form the reading segment. Quite commonly the major lens constituting the distance vision portion is of crown glass and the reading segment for near vision is of flint glass. The depression is usually ground in the convex side of meniscus blanks and is itself either spherical or plano, for the higher powers of addition being a concave countersink. If the minor lens blank be one homogeneous piece of glass of a single index throughout, as for example, a flint button, when the bifocal or convex side of the blank is finally surfaced, the inserted button becomes a spherical wafer with a thin, knife edge periphery. The optical center of such a segment is substantially at its geometrical center when the opposite face of the blank is finished to prescription, and furthermore in the higher reading powers the color at the edges of the segment due to chromatic aberration becomes troublesome.

To raise the optical center of the segment and to give the segment a shouldered periphery instead of a knife edge and thus avoid the colors at the edge, the minor lens blank or button may be made with a flint or other high index center surrounded by crown glass or glass of the index of the major blank, the flint and the surrounding crown glass being edge fused together; and it is to blanks and lenses of this character that my invention particularly pertains.

One of the principal advantages of my invention is the elimination of the danger of breakage in the fusing of the button due to the unequal expansion and contraction of the two kinds of glass. Another advantage is the provision of guide marks on opposite sides of the segment to serve as indices to the grinder in the lateral disposition of the optical center of the segment, that is, in disposing the center in or out as desired. Other objects and advantages of my invention will appear from the following description.

One characteristic of my invention is the fact that the collar of the button member which is edge fused about the flint segment is in two parts, and the parts are so fitted and fused together as to eliminate the danger of breakage during fusing.

Another characteristic of my invention is the provision of laterally extending marks on opposite sides of the segment to guide one in grinding the blank so as to enable him to throw the center of the segment in or out the desired amount. In a button having the two-part collar of crown glass surrounding the flint segment these lines are formed by the proximate edges of the two parts of the collar. If a space is left between those edges, the adjacent shoulders serve to form the guide marks, while if the two sections have their proximate edges fused together, the line of fusion remains visible and forms the index marks.

It has been observed that the shouldered periphery of the segment in the finished lens forms a bright band which is objectionably noticeable. My invention comprehends means for eliminating the bright character of this edge, as will be hereinafter fully described.

I shall now explain my invention with reference to the accompanying drawing and shall thereafter point out my invention in claims.

Figure 1 is a face view of the three elements composing the button comprehended by my invention, showing the button in an intermediate stage of production.

Figure 2 is a vertical central cross section of the same.

Figure 3 is a face view of the same in completed condition.

Figure 4 is a face view of the bifocal side of the complete blank after the button is fused in the countersink.

Figure 5 is a central sectional elevation of the same on the line 5—5 of Fig. 4.

Figure 6 is a transverse sectional plan of the same on the line 6—6 of Fig. 4.

Figures 7, 8 and 9 are successive views of the bifocal face of the blank in successive stages of grinding.

Figure 10 is a view of the bifocal face of a blank having the button fused in the countersink, the button having a slight space between the proximate edges of the two surrounding or collar sections.

Figure 11 shows the bifocal face of the same blank in finished form.

Figure 12 is a detail in perspective of the button shown in Fig. 10, prior to fusing and with the three elements separated.

In discussing my invention I shall refer to the glass of the major lens blank and of the collar portion of the button surrounding the segment as crown glass, and I shall refer to the glass of the segment itself as flint glass, it being understood that these are not intended to be used in any limiting sense, the only requisite being that the segment shall have a different index of refraction from the collar and that the index of the collar be substantially that of the major blank portion in bifocal lenses.

In the finished button, as shown in Fig. 3, the flint segment A is surrounded by two collar sections B and C, edge fused thereto and to each other. One mode of procedure in the making of this button is suggested in Figs. 1 and 2. The segment A can be made of any desired shape. In this illustrated form it approximates a semicircle with its upper edge slightly curved downwardly. First the flint segment A can be ground to semicircular form, as shown in Figure 1, and the collar section B have one edge concaved to receive and fit about the circular edge of the segment. The two may then be fused together, as shown in Figs. 1 and 2, and the top edge may then be ground off to a continuous downward curvature, as indicated by the dotted line. The collar section C may have one edge ground to the same curvature as the top edge of the other two elements, after which section C will be fitted and fused in place, as shown in Fig. 3. This process of forming the button minimizes the danger of breakage due to the unequal expansion of the flint and crown glass and at the same time the fusion of the proximate edges of the sections B and C together provides the demarcation lines $b$ and $b'$, which serve as guides in the subsequent grinding of the bifocal face, as will hereinafter more fully appear.

This composite button is larger than the usual flint button used in the manufacture of Kryptok lenses. Consequently the depression or countersink which is ground in the edge of the blank is correspondingly larger. This is illustrated in Figs 4, 5 and 6, where the composite button is shown as fused in the spherical countersink formed in the convex face of the meniscus blank D. This fusing is a familiar operation and need not be described further than to say that the one face of the button is ground substantially with the curvature of the depression and is laid in the depression and subjected to fusing heat.

Since the collar of the button, consisting of the sections B and C is composed of the same glass as that of the blank D the collar becomes blended into the blank, and forms an indistinguishable part thereof, the segment A alone remaining distinguishable by reason of its different index of refraction.

The blank is finished by grinding the bifocal surface down to a continuous base curvature and polishing or surface finishing it, the blank being usually sold from the factory in that form, that is, finished on one side, the other side being ground and finished by the dispenser in accordance with the prescription.

In the rough stage, that is, after fusing and before the bifocal face is ground down and finished, the segment A has a shouldered edge around its entire periphery. The disposition of the optical center of the segment, which is indicated by the line $x$—$x$ in Figs. 5 and 6, will depend upon the axis of generation of the finished bifocal surface. If, for example, the bifocal surface be finished to that indicated by the dotted line marked B S in Figs. 5 and 6, it will be observed that the optical center of the reading segment will be well above and considerably to the left of the geometrical center. That is because the flint segment as thus ground is a decided prism with the base up and out, the reading segment being for that reason decentered toward the prism base.

This moving of the center out or to the left is made possible by reason of the index lines $b$ and $b'$, as appears in Figs. 7, 8 and 9. The first or rough grinding of the bifocal side of the blank is as a rule done by hand, that is, the grinder holds the blank with the bifocal side against a revolving lap of a predetermined base curvature. If it is desired to throw the center in, as represented in Fig. 6, the blank will be presented at an angle to the lap so as to grind off the right side of the button, as viewed in Figs. 5 and 6, faster than the left side; also to throw the center up the blank is so presented to the lap as to grind the bottom of the button faster than the top. In other words, the lower righthand quadrant of the button is the one first ground and that angular disposition of the blank is maintained throughout the subsequent grinding until the surface is finished.

The amount which the center is thrown in or out can be very accurately gaged by the relative lengths of the index lines $b$ and $b'$, and as far as I am aware this is the first fused blank which has enabled the grinder to throw the center of the reading segment in or out a controlled amount.

Three stages of the grinding are shown in Figs. 7, 8 and 9. Let it be assumed that it is desired to throw the center out one millimeter, that is, to decenter it that amount toward the temple side of the lens, and let it be assumed that the lines $b$ and $b'$ are each four millimeters in length. The operator will present the blank to the rotating lap with the lower righthand quadrant in contact therewith and what in his judgment is approximately the right inclination. In order to decenter the segment one millimeter to the left, it is necessary that the grinding be so started that two millimeters of the line $b$ be ground off before the line $b'$ begins to shorten in the grinding operation. This condition is substantially illustrated in Fig. 7. The continued grinding of the button with the blank presented at this angle further shortens the line $b$ and begins to shorten the line $b'$ at the same rate. This is substantially illustrated in Fig. 8, where the shoulder of the collar or outer periphery of the button has been ground away in the lower righthand quadrant. The grinding of the surface at this same angle will be continued until the shoulder of the button and the exposed portion of the countersink has been entirely ground away. This condition is illustrated in Fig. 9 where substantially two millimeters of the line $b'$, that is, the fused edge between the elements A and C, remain. The grinder then knows that the center $x$ is moved over to the left one millimeter. He also knows that the center is substantially raised above the geometrical center of the segment. After the opposite side of the blank is ground to prescription the lens will be cut out to the desired shape, for example, that indicated by the dotted circular line in Fig. 9, which, as will be observed, leaves a portion of the distance lens below the reading segment, for aid in looking down, as for example, in descending steps.

Instead of fusing the button in the two operations, as above described, and actually bringing the sections B and C into physical union, a small space may be left between the proximate edges of the two sections and the three elements be fused together in a single fusing operation. Such a button is illustrated in Fig. 10. In this case the segment A will initially be ground to its final shape and the collar sections of crown glass B' and C' will be shaped to fit exactly about their respective portion of the segment, the edges of the opposing lateral portions of the collar sections being ground so as to leave preferably a very slight clearance to insure exact fitting of the collar sections about the segment. This clearance need not be more than a fraction of a millimeter, and is shown somewhat exaggerated in Fig. 10. However, since this clearance leaves two spaced shoulders instead of a line of fusion it is necessary in the final grinding that the shoulders be entirely ground away. The shoulders do, however, form lateral demarcations which will guide the grinder in throwing the center of the segment in or out, as desired.

In Fig. 10 the dotted circular line R indicates the outline of the recess or depression in one finished position of the bifocal surface.

Figure 11 represents the bifocal side of the blank finished so as to have the recess R disposed as indicated in Fig. 10. In such case the optical center of the segment is substantially at the point $x$. Laterally the recess R is symmetrically disposed with respect to the segment A and in order to assure the complete elimination of the shoulders of the proximate edges of the collar sections B' and C', the grinding is continued, as indicated by the circle R, until it enters the corners of the segment. The result is shown by the shape of the segment in Fig. 11. To throw the center $x$ in or out it is only necessary to so dispose the finished bifocal surface that the recess R is disposed laterally and eccentric to the segment in the direction that it is desired to throw the center. The extent of this lateral shifting of the recess R with respect to the segment will be controlled and guided by the shoulders as indices. When the center is thus laterally shifted with this type of button, the finished segment will be assymmetrical in that one corner will be ground off to a greater extent than the other. This, however, will scarcely be observable to the ordinary wearer and will be little or no disadvantage.

Since the segment in this type of lens is bounded by a shoulder rather than by a knife edge, that shoulder serves to diffuse and reflect the light and presents a band in the finished lens, which at times is objectionably bright. In order to obviate this I propose to treat this shoulder in such a way as to make it substantially opaque and non-reflective. For this purpose I apply between the edges of the collar and of the segment a film which will serve as a light screen and yet will not interfere with the molecular union of the adjacent surfaces, in other words, at the fusing heat will have an affinity for the glass.

Many substances can be used for such film but I have found it satisfactory to employ a dye mixed with any one of several of the common fluxes used in ceramics. Among suitable fluxes for this purpose may be mentioned lead oxide, boric acid, soda, potash, barium, alumina, lime and magnesia. A combination of such fluxes, such as soda, lime and magnesia, together with a suitable dye, provides a very satisfactory light screen when applied as a film to the glass shoulders prior to fusing. For example, as indicated in Fig. 12, the material may be applied as a film to the edge of the segment A before the parts are fitted together and fused. In this figure the three elements of the button are shown separated but ready to be fitted together to produce a button similar to the one shown in Fig. 10.

Other embodiments of my invention than those above mentioned will readily occur to those skilled in the art. For example, lines of demarcation, such as b and b', may be produced optionally on one or the other of the contact fusing surfaces, when the lines are not produced by the fusing of the button. In such case the index lines may be marked at opposite points either on the fusing surface of the collar or of the countersink.

I claim:

1. A multifocal lens blank comprising a major lens portion of one index of refraction having a countersink in one face thereof, and a minor lens portion fused in the countersink and composed of a segment of different index of refraction having substantial edge thickness and encompassed by at least two pieces of glass of substantially the same index of refraction as the major lens portion and fitting around and fused to the edge of the segment and substantially meeting so as to form a demarcation on each side of the segment to guide in the lateral disposition of the optical center of the segment in the subsequent grinding.

2. For multifocal lens blanks a minor lens portion for fusing in a countersink comprising a segment of one index of refraction having substantial edge thickness about its entire periphery and two pieces of glass of a different index of refraction fitting about and fused to the edge of the segment with their proximate edges forming lines of demarcation on opposite sides of the segment.

3. For multifocal lens blanks a minor lens portion for fusing in a countersink comprising a segment of one index of refraction having a substantial edge thickness about its entire periphery and bounded by a plurality of individual pieces of glass of a different index of refraction shaped and fused to the edge of the segment and substantially encompassing the same.

4. For multifocal lens blanks a minor lens portion for fusing in a countersink comprising a segment of one index of refraction having a substantial edge thickness about its entire periphery and surrounded by glass of different index of refraction fused to the edge thereof and constituting a plurality of individual pieces.

5. For multifocal lens blanks a minor lens portion for fusing in a countersink comprising a segment of at least two pieces of glass of different index of refraction fused edge to edge, and a film amalgamated with the glass at the fused edges and constituting a light screen.

6. For multifocal lens blanks a minor lens portion for fusing in a countersink comprising an inner glass segment of relatively high index of refraction and a surrounding glass member of lower index fused to the segment edge to edge substantially about its entire periphery, and a film amalgamated with the glass about the edge of the segment and constituting a light screen.

7. For multifocal lens blanks a minor lens portion for fusing in a countersink comprising a segment of one index of refraction having substantial edge thickness about its entire periphery and two pieces of glass of a different index of refraction fitting about and fused to the edge of the segment with their proximate edges forming lines of demarcation on opposite sides of the segment, and a film amalgamated with the glass about the edge of the segment and constituting a light screen.

8. A multifocal lens blank comprising a major lens portion of one index of refraction having a countersink in one face thereof, a minor lens portion fused in the countersink and composed of a segment of different index of refraction having substantial edge thickness and encompassed by at least two pieces of glass of substantially the same index of refraction as the major lens portion and fitting around and fused to the edge of the segment and substantially meeting so as to form a demarcation on each side of the segment to guide in the lateral disposition of the optical center of the segment in the subsequent grinding, and a film amalgamated with the glass about the edge of the segment and constituting a light screen.

9. A multifocal lens blank comprising a major lens portion of one index of refraction having a countersink in one face thereof, and a minor lens portion fused in the countersink and composed of a glass segment of a higher index of refraction having substantial edge thickness and sustantially surrounded by a two part glass member of substantially the same index of refraction as the major lens portion fused edge to edge to the segment with the proximate edges of the two parts of the surrounding member forming lines of demarcation on opposite sides of the segment, and a film amalgamated with the glass about the edge of the segment and constituting a light screen.

10. A multifocal lens blank comprising a major lens portion of one index of refraction having a countersink in one face thereof, a minor lens portion fused in the countersink and composed of a segment of different index of refraction having substantial lateral edge thickness and flanked on each side by glass of substantially the same index of refraction as the major lens portion and edge fused to the segment, and perceptible substantially radial lines on opposite sides of the segment for controlling the lateral disposition of the optical center of the segment in the subsequent grinding.

11. A multifocal lens blank comprising a major lens portion of one index of refraction having a countersink in one face thereof, a minor lens portion fused in the countersink and composed of a segment of different index of refraction having substantial edge thickness and encompassed by glass of substantially the same index of refraction as the major lens portion and fitting around and fused to the edge of the segment, and perceptible substantially radial lines on opposite sides of the segment for controlling the lateral disposition of the optical center of the segment in the subsequent grinding.

12. The method of making a multifocal lens which consists in forming a countersink in a major lens portion, shaping a piece of glass of different index of refraction to the outline of the reading segment, grinding a plurality of pieces of glass of substantially the same index of refraction as the major lens to fit about the segment and together substantially to encompass it, edge fusing the encompassing glass pieces to the segment to form a composite minor lens portion, and fusing the minor lens portion into the countersink.

13. The method of making a multifocal lens which consists in forming a countersink in a major lens portion, partially shaping a piece of glass of different index of refraction to the outline of the reading segment, grinding a piece of glass of substantially the same index of refraction as the major lens to fit about the shaped portion of the segment and edge fusing the two together, grinding the exposed peripheral portion of the segment and the adjacent edges of the surrounding glass piece to a continuous edge, shaping a second piece of glass of the same index of refraction as the major lens to fit said continuous edge and fusing it thereto, thereby forming a composite three part minor lens, and fusing the minor lens in the countersink.

14. The method of making a multifocal lens blank consisting in forming a countersink in a major lens blank, forming a minor lens blank by edge fusing about a segment of relatively high index of refraction two glass members of the same index of refraction as the major lens blank enclosing the segment and forming at their proximate edges a line of demarcation on each side of the segment, fusing the minor lens blank in the countersink, and surfacing the face containing the minor lens blank to a continuous spherical curvature with the lines of demarcation of a predetermined relative length for the desired lateral disposition of the optical center of the segment.

In witness whereof, I hereunto subscribe my signature.

GEORGE A. CLEMENT.